Figure 1:
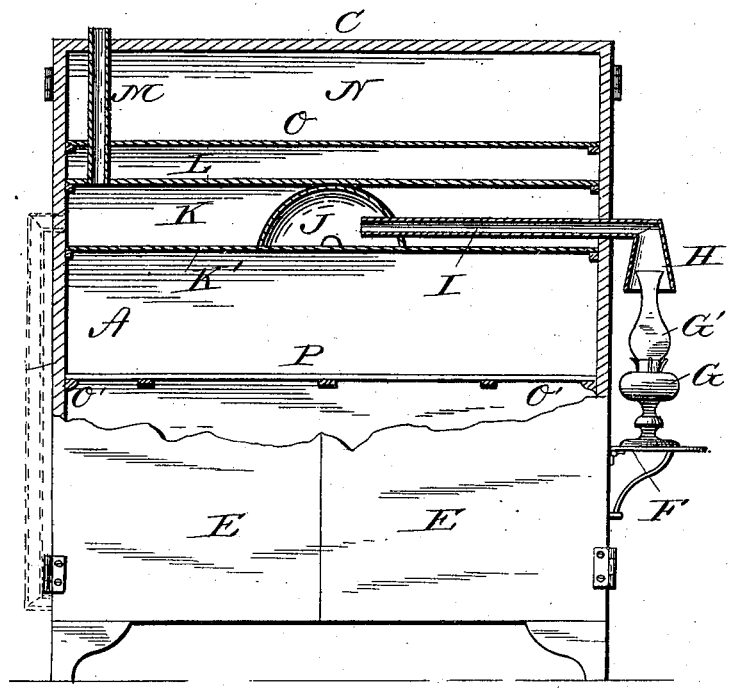

(No Model.)

J. M. TINKER.
BREAD RAISER.

No. 576,632. Patented Feb. 9, 1897.

Witnesses.
F. L. Ourand
K. A. Isau

Inventor.
Jennie M. Tinker.
By John Hedderburn
Attorney.

UNITED STATES PATENT OFFICE.

JENNIE M. TINKER, OF ELLWOOD CITY, PENNSYLVANIA.

BREAD-RAISER.

SPECIFICATION forming part of Letters Patent No. 576,632, dated February 9, 1897.

Application filed May 13, 1896. Serial No. 591,405. (No model.)

*To all whom it may concern:*

Be it known that I, JENNIE M. TINKER, a citizen of the United States, residing at Ellwood City, in the county of Lawrence and State of Pennsylvania, have invented certain new and useful Improvements in Bread-Raisers; and I do hereby declare the following to be a full, clear, and exact description of the invention, such as will enable others skilled in the art to which it appertains to make and use the same.

This invention relates to certain new and useful improvements in heat-ovens designed for raising bread, souring milk or cream, and the like; and it has for its object, among others, to provide a simple and cheap oven for this purpose in which the hot air is introduced at the top, the heat being furnished by a lamp placed on a bracket by the side of the oven and the bracket or shelf being hinged so as to be thrown down out of the way when not in use. A vent-pipe is provided from the hot-air chamber to furnish a draft for the lamp. The hot air is conveyed directly to the reflector, and a dead-air space is provided above the hot-air chamber, so as to prevent escape of heat at the top of the same.

Other objects and advantages of the invention will hereinafter appear, and the novel features thereof will be specifically defined by the appended claim.

The invention in this instance resides in the peculiar construction and the combination, arrangement, and adaptation of parts, all as more fully hereinafter described, shown in the drawings, and then particularly pointed out in the claim.

The invention is clearly illustrated in the accompanying drawings, which, with the letters of reference marked thereon, form a part of this specification, and in which—

Figure 2:
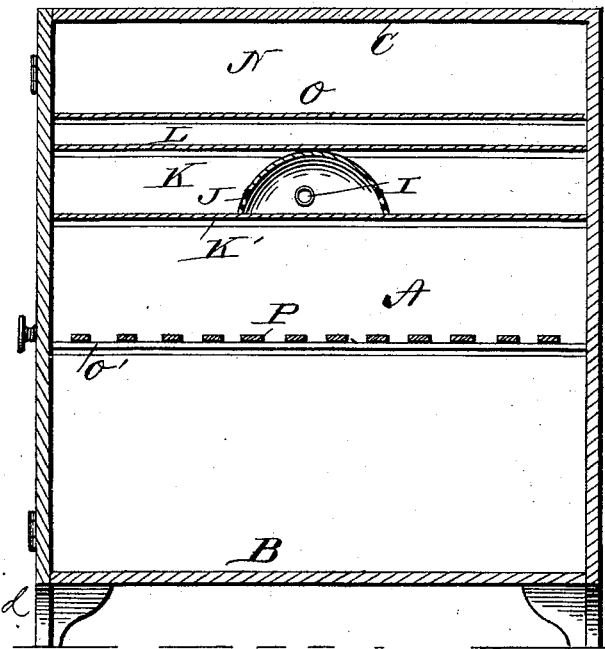

Figure 1 is a vertical section through the oven constructed in accordance with my invention. Fig. 2 is a cross-section through the same.

Like letters of reference indicate like parts in both views.

Referring now to the details of the drawings by letter, A designates the walls of the oven, B the bottom, and C the top, which is preferably of wood. The oven may be supported upon suitable legs, as shown, and is provided with doors E at the front, which are hinged to opposite sides of the oven.

F is a bracket or shelf hinged to the side of the oven on the outer face thereof, and on this shelf is adapted to be supported a lamp G, of any well-known or approved style. The chimney G' of this lamp extends within the lower end of the cone-shaped pipe H, the upper end of which is connected with the hot-air pipe I, which extends through an opening in the side wall of the oven and terminates beneath the tin reflector J, which is arranged within the hot-air chamber K, the bottom of which is formed by the galvanized-iron or tin plate K' and its top by the zinc plate L, and between these plates the reflector is arranged.

M is a vent-pipe from the hot-air chamber and extended through the top of the oven, as shown. In the dead-air space N is the zinc bread board or shelf O, while in the space beneath the hot-air chamber is the removable shelf P, supported on suitable guides O', as shown. This shelf is slotted, as shown, so that the air may readily pass through the same.

In practice the heat from the lamp is conveyed to the hot-air chamber through the pipe which enters the hot-air closet, with its inner end coming directly under the reflector, which is dish-shaped and is designed to throw the heat downward, while the zinc is a non-conductor of heat and prevents the heat from rising, and thus the heat is kept down sufficiently to heat the bread-closet and yet there is enough rises to keep the top moderately warm. The bread-board is always kept warm and ready for use by the time the bread is ready to be molded, chilling of the bread is avoided, and no cloths are necessary.

The oven may be used for souring cream by removing the shelf from the warm closet and placing the cream therein, and cream soured in this oven will give better returns of butter than when otherwise treated before churning.

If desired, the vent-pipe may be arranged at the side instead of at the top and may be carried down to the lower heater-box or heat-oven, so as to carry the warm air that escapes from the upper oven down to the lower one.

What is claimed as new is—

The combination with the oven having a partition and a plate above the same forming between them a hot-air chamber, of a reflector arranged within the hot-air chamber between said partition and plate, a bracket secured to the outer wall of the oven for supporting a lamp, and a pipe extending into the hot-air chamber and through said reflector and having at its outer end a cone-shaped pipe the bottom open end of which is arranged above said bracket and adapted to receive the upper end of the lamp-chimney, all substantially as herein shown and described.

In testimony whereof I have signed this specification in the presence of two subscribing witnesses.

JENNIE M. TINKER.

Witnesses:
SAML. A. ROELOFS,
J. C. LEOHNER.